United States Patent [19]

Fillion

[11] 4,027,627

[45] June 7, 1977

[54] AUTOMATIC FOOD FEEDING DEVICE FOR FISH, FOWL AND THE LIKE

[76] Inventor: Romeo Fillion, 2425 Chapleau Street, Sillery, Quebec, Canada, G1T 1M5

[22] Filed: Mar. 6, 1975

[21] Appl. No.: 556,197

[52] U.S. Cl. .......................... 119/51.11; 119/56 R; 119/56 A; 239/666
[51] Int. Cl.² .................... A01K 5/02; A01K 61/02
[58] Field of Search .......................... 119/51–56; 239/666, 665, 681, 687; 222/290, 410

[56] References Cited

UNITED STATES PATENTS

| | | | |
|---|---|---|---|
| 1,215,955 | 2/1917 | Mehlberger | 239/666 |
| 2,754,032 | 7/1956 | Faust et al. | 222/311 |
| 3,195,508 | 7/1965 | Lehman et al. | 119/51.11 |
| 3,688,744 | 9/1972 | Kaplan | 119/51.11 |
| 3,742,913 | 7/1973 | Crippen | 119/51.11 |

Primary Examiner—Hugh R. Chamblee
Assistant Examiner—Peter K. Skiff
Attorney, Agent, or Firm—Raymond A. Robic; Eugene Mar; Arthur Schwartz

[57] ABSTRACT

A feeding device for automatically feeding fish and livestock predetermined amounts of food at predetermined intervals. The device includes a canister for holding a supply of food which is dispensed out the bottom of the canister. A rotatable surface is provided beneath the bottom of the canister for receiving and distributing the dispensed food. A retaining wall serves to control the distribution of a width of food in a substantially tangential direction with respect to the rotatable surface. A control system permits the automatic setting of the predetermined amounts of food to be fed at predetermined intervals.

9 Claims, 5 Drawing Figures

U.S. Patent  June 7, 1977  Sheet 1 of 2  4,027,627
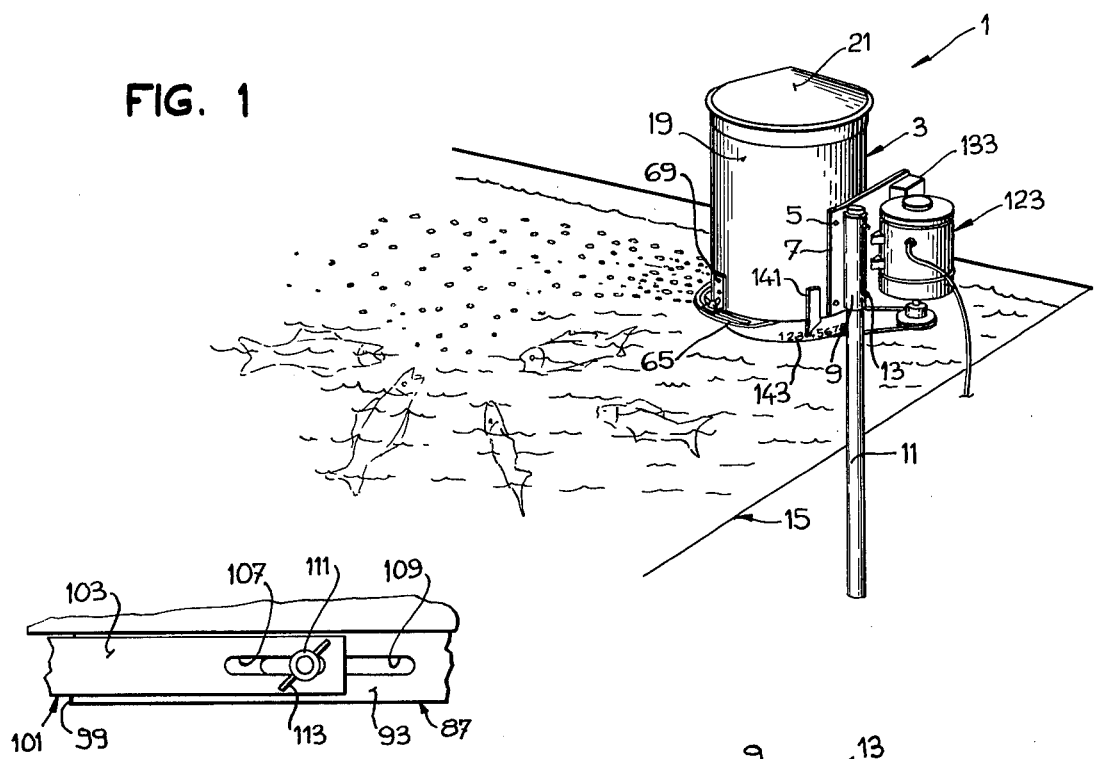
FIG. 1
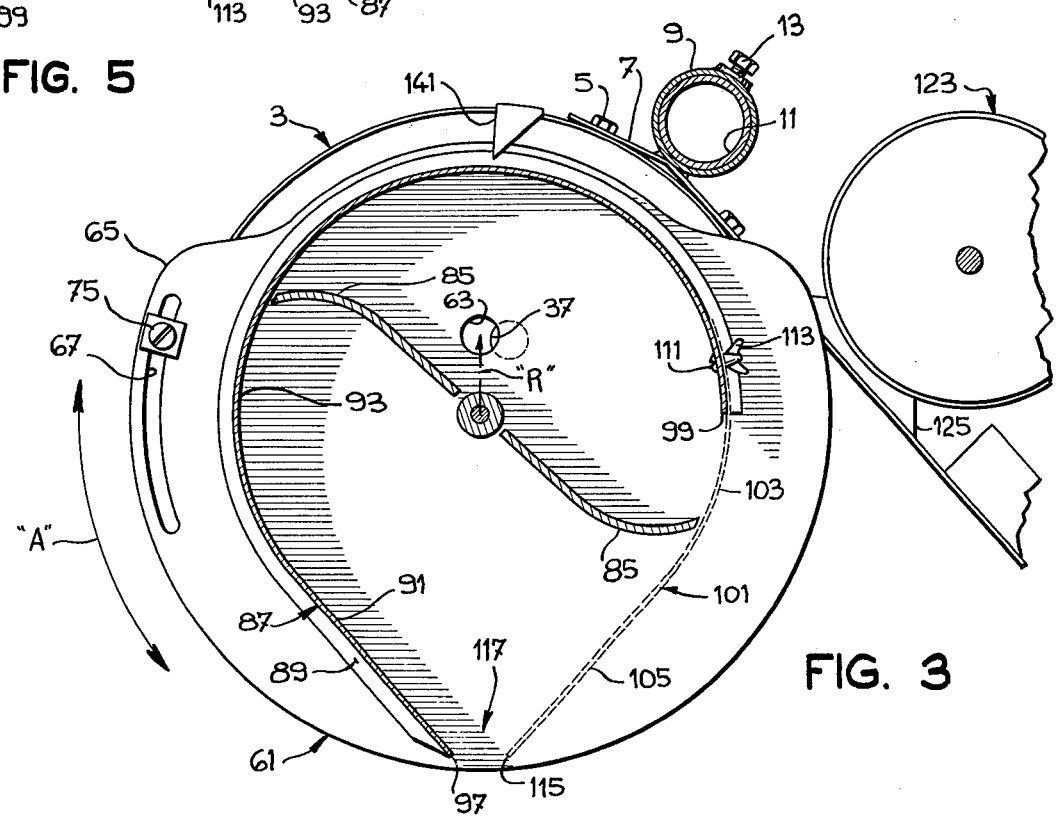
FIG. 5
FIG. 3

AUTOMATIC FOOD FEEDING DEVICE FOR FISH, FOWL AND THE LIKE

The present invention relates to a feeding device.

This invention more particularly relates to a device for automatically feeding fish predetermined amounts of food at predetermined periods.

Certain requirements are associated with feeding fish. The fish must be fed at regular and frequent intervals. Also, at each feeding, the food must be fairly uniformly distributed in measured amounts to minimize spoilage. If too much food is distributed over a small area, much of it will settle on the bottom of the pool or pond holding the fish and will spoil.

The above requirements are largely met by using experienced personnel. However, such personnel is expensive.

It is the purpose of the present invention to provide an automatic feeding device which meets the above feeding requirements thus largely eliminating the need in expensive, experienced labour, thereby reducing the cost of raising fish.

The feeding device of the present invention is constructed to automatically feed fish with measured amounts of food at predetermined periods. The device can be set to feed the fish at times selected by operator, and for a selected length of time. The device can also be set to distribute a predetermined amount of feed independently of the length of time the device operates each feeding time.

The feeding device is also constructed to broadcast the food in a stream over the surface of the pond or pool holding the fish to be fed. The device has means for varying the width of this stream thus adjusting the density of the feeding over the surface of the pond.

The feeding device is simple in construction and operation, reliable in operation, and relatively inexpensive to purchase and operate.

The present invention is particularly directed toward a feeding device which comprises a canister for holding food and means at the bottom of the canister for dispensing the food. A distributing surface is provided beneath the bottom of the canister for receiving the dispensed food and means rotate the surface to distribute the food off it. Means are provided for automatically controlling the rotating means to rotate the surface at predetermined intervals.

The feeding device includes means on the control means to vary the length of each predetermined interval.

The feeding device also includes means to adjust the dispensing means to control the amount of food dispensed from the canister onto the distributing surface.

Retaining means are provided on the device to cooperate with the distributing surface to distribute the food off the surface in a stream in a given direction. Preferably, the retaining means are adjustable to preset the width of the stream.

The invention will now be described in detail having reference to the accompanying drawings in which:

FIG. 1 is a perspective view of the feeder in operation;

Figure 2:
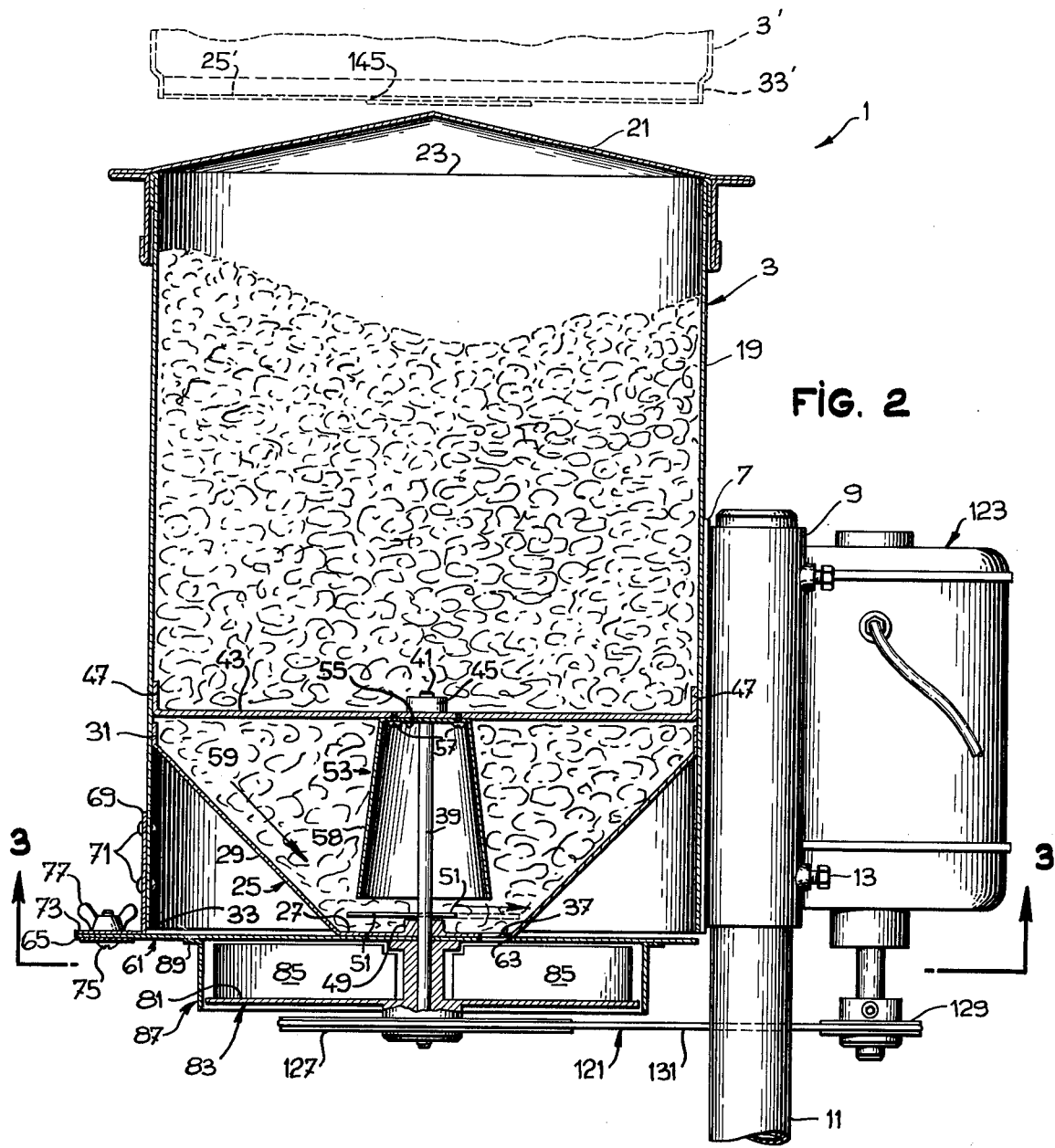
FIG. 2 is an elevation view of the feeder in partial cross-section.
Figure 4:
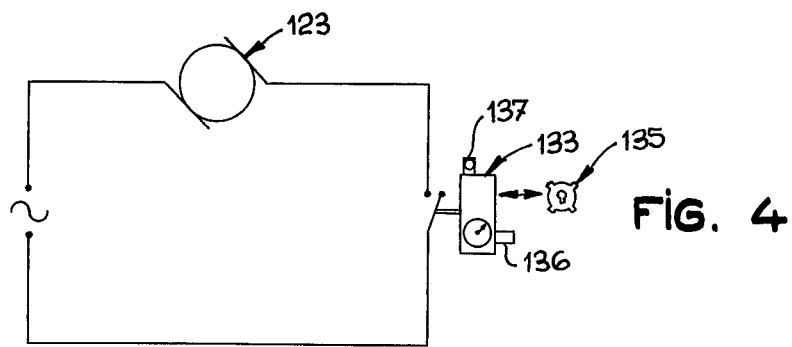

FIG. 3, appearing on the same sheet as FIG. 1, is a cross-sectional view of the feeder taken along line 3—3 of FIG. 2;

FIG. 4 illustrates the circuitry for operating the feeder; and

FIG. 5, appearing on the same sheet as FIG. 1, illustrates a detail of the retaining wall.

The feeder device 1 of the present invention, as shown in FIG. 1, has a cylindrical canister 3 for holding food, mounted by bolts 5 on a mounting plate 7. The mounting plate 7 carries a tubular sleeve 9 by which the plate 7 and canister 3 can be detachably mounted on a pipe 11 by bolts 13. The pipe 11 is mounted on the side of a pool 15 holding the fish to be fed.

The canister 3 has a tubular sidewall 19 and a cover 21 which tightly fits over the top rim 23 of sidewall 19 as shown in FIG. 2. A bottom wall 25 closes the canister sidewall. The bottom wall has a central, horizontal bottom portion 27 and an outer, upwardly sloping sidewall portion 29. The top 31 of the sidewall portion 29 is attached to the tubular sidewall 19 a distance above its bottom rim 33.

A food outlet aperture 37, preferably circular is provided in bottom portion 27 of bottom wall 25 adjacent to the sloping sidewall portion 29 as shown in FIG. 3.

A drive shaft 39 extends up through the center of bottom portion 27 of bottom wall 25. The upper end 41 of shaft 39 projects through a cross-support 43 and has a support member 45 to hold it to the support 43. The ends 47 of cross-support 43 are upturned and attached by suitable means to tubular sidewall 19 just above top edge 31 of bottom wall 25. A second support member 49 holds in position the shaft 39 just above bottom wall 25. A narrow slit-pin 51 is attached through the shaft 39 just above member 49 and extend horizontally from shaft 39 in either direction. The slit-pin 51 is long enough to extend slightly past aperture 37.

A shroud 53 is provided to cover the central part of the bottom portion 27 of bottom wall 25. The shroud 53 is attached by an end wall 55 and screws 57, to cross-support 43 and its tubular skirt 58 depends down from end wall 55 to a position closely adjacent to fingers 51. The shroud 53, together with the rotating fingers 51, prevent the food particles from clogging or jamming the outlet aperture 37. The shroud 53, together with sloping sidewall 29, form a narrow annular gap 59 through which the food particles move, by gravity to bottom portion 27 of bottom wall 25. The rotating fingers 51, just beneath gap 59, loosen the food particles preventing the gap 59 from jamming while also moving the food particles toward aperture 37.

Means are provided for reducing the size of aperture 37 so as to control the amount of food particles being distributed and/or to accomodate different sized food particles. For example, if the particular food being fed consists of large sized particles, the aperture 37 is left uncovered or only partially covered, while if the food comprises relatively smaller particles, the aperture 37 is covered to a relatively greater extend. The aperture size reducing means preferably comprise a horizontal plate 61 rotatably mounted on shaft 39, beneath, but adjacent bottom portion 27 of bottom wall 25 of the canister 3. The plate 61 has an aperture 63, preferably circular and the same size as aperture 37, and located a distance "R" from the center of shaft 39 which distance is the same distance aperture 37 is located from the center of shaft 39.

The plate 61 also has a portion 65 which projects laterally past the canister 3. The projecting portion 65 has a curved guide slot 67, the center of the radius of curvature of which is the shaft 39. A bracket 69 is attached to the sidewall 19 of canister 3, adjacent its bottom rim 33, by rivets 71, or other suitable means. The bracket 69 has a projecting end 73 lying on top of portion 65 of plate 61. End 73 has a hole aligned with slot 67. A bolt 75 is passed up through the hole and slot 67 and a wing nut 77 is put on the bolt 75.

In operation, to adjust the size of outlet aperture 37 the wing nut 77 is loosened, and plate 61 is rotated about shaft 39 in either direction as shown by the arrow "A" in FIG. 3, to move its aperture 63 to a greater or lesser aligned position with aperture 37 thus increasing or decreasing the size of the aperture 37. Once the size has been adjusted, the wingnut 77 is again tightened.

The food particles fall through aperture 37 and aperture 63 onto a rotatable distributing surface 81. The distributing surface 81 consists in the upper surface of a circular, horizontal plate 83 fixedly mounted on shaft 39. A pair of radially extending, opposed blades 85 are mounted on surface 81 to help distribute the food particles. A fixed vertical retaining wall 87 surrounds a substantial portion of plate 83. The wall 87 has a top flange 89 by means of which it is attached to the underside of plate 61. A portion 91 of wall 87 extends outwardly at a tangent from the remainder of wall portion 93 which is circular. A gap is formed between ends 97, 99 of portions 91, 93 respectively through which the food particles are dispersed or broadcast in a stream from plate 83 when it rotates. The feeder device 1 is placed on the side of the pond with the gap facing out to the pond. A movable vertical wall 101 is provided, cooperating with wall 87, to adjust the size of the gap and thus the width of the food stream. The wall 101 has a curved circular portion 103 and a straight tangential portion 105. The curved portion 103 has an elongated slot 107. The curved portion 93 of fixed wall 87 also has an elongated slot 109 near its end 99. A bolt 111 passes through slots 107, 109 and is attached to a wingnut 113, to attach the movable wall 101 to the fixed wall 87. The end 115 of the tangential portion 105 of wall 101 thus cooperates with end 97 to form gap 117 as shown in FIG. 3. The size of the gap 117 can be changed by loosening wingnut 113 and sliding wall 101 along wall 87 in either direction.

The shaft 39 is rotated by a belt and a pulley drive 121 driven by a motor 123 which is mounted by a bracket 125 on mounting plate 7. The driven pulley 127 is mounted on the lower end of the shaft 39 and the drive pulley 129 is mounted on motor 123. A drive belt 131 connects pulleys 127 and 129.

The motor 123 is operated automatically by a timing device 133. The timing device 133 is mounted on plate 7 and is electrically connected to the motor 123 to operate the motor at predetermined time intervals. The timing device 133 can have changeable timing disks 135 so that the operator can use a disk to set the device to feed at predetermined intervals, to his particular requirements. Each interval lasts for a predetermined time. A control 136 can be provided to change the time of each interval. A light sensor 137 can also be provided in device 133 operable to activate device 133 only during daylight hours and to deactivate it during the night.

To provide a visual indication of the size of outlet aperture 37, a fixed pointer 141 can be fixed to canister 3 to project from its bottom rim 33 and a scale 143, indicating the size of the aperture, can be provided on fixed wall 87 which moves with plate 61 relative to canister 3.

If desired, one or more additional canister 3' can be stacked on top of each other, to provide a greater amount of food as shown in FIG. 2. The cover 21 is removed from canister 3 and the additional canisters have a formed bottom rim 33' which fit on top of rim 23 and a bottom wall 25' which has a readily openable central aperture 145 to feed into the lower canister.

I claim:
1. A feeding device comprising:
   a. a canister for holding a supply of food to be dispensed;
   b. means carried by the canister adjacent the bottom thereof for dispensing the food therefrom;
   c. a rotatable substantially planar horizontal surface provided with at least one fixed distributor blade for receiving and distributing the dispensed food by centrifugal force upon rotation of the surface; and
   d. adjustable retaining means for controlling the distribution of a width of food in a substantially tangential direction with respect to the rotatable surface, which retaining means includes a vertical wall surrounding a substantial portion of the periphery of the rotatable surface and having:
      1. a fixed portion, and
      2. a movable portion that is adjustble relative to the fixed portion along a horizontal path for defining a variable width peripheral opening therewith to thereby control the width of the food being distributed.
2. The feeding device of claim 1 wherein:
   a. the fixed portion includes a circular section and an end section which extends outwardly at a tangent from one end of the circular section;
   b. the movable portion includes a circular section and a straight tangential section; and
   c. wherein the circular section of the movable portion is adjustably connected to the circular section of the fixed portion such that the free end of the tangential section of the movable portion cooperates with the tangential end portion of the fixed portion to define a variable gap for distributing a predetermined width of food.
3. The feeding device of claim 1 wherein:
   a. the vertical wall includes a fixed circular section and a curved movable section;
   b. the curved movable section is adjustably connected at one end to one end of the fixed circular section; and
   c. the other end of the curved movable section cooperates with the other end of the fixed circular section to define an adjustable gap for distributing a predetermined width of food.
4. The feeding device of claim 1 further including means at the bottom of the canister to assist in maintaining the flow of food to the dispensing means.
5. The feeding device of claim 1 further including means to adjust the dispensing means for the purpose of controlling the amount of food dispensed from the canister onto the rotatable surface.
6. The feeding device of claim 5, wherein:
   a. the dispensing means includes a first aperture adjacent the center of the bottom of the canister;
   b. the adjusting means includes a rotatable plate adjacent the bottom of the canister; and
   c. the rotatable plate includes a second aperture such that when the plate is rotated, the first and second apertures may be overlapped to a predetermined degree so that the amount of food being dispensed through the overlapped portions of the apertures may be controlled.

7. The feeding device of claim 1 further including means for rotating the rotatable surface.

8. The feeding device of claim 7 further including means to automatically control the rotating means to rotate the rotatable surface at predetermined time intervals.

9. The feeding device of claim 8 further including means to vary the time lengths of such predetermined intervals.

* * * * *